United States Patent
Hwang et al.

(10) Patent No.: US 9,816,591 B2
(45) Date of Patent: Nov. 14, 2017

(54) PLANETARY GEAR TRAIN OF AUTOMATIC TRANSMISSION FOR VEHICLE

(71) Applicant: Hyundai Motor Company, Seoul (KR)

(72) Inventors: Dong Hwan Hwang, Seoul (KR); Sueng Ho Lee, Seoul (KR); Chang Wook Lee, Suwon-si (KR); JongSool Park, Hwaseong-si (KR); KyeongHun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 14/941,357

(22) Filed: Nov. 13, 2015

(65) Prior Publication Data

US 2016/0356360 A1 Dec. 8, 2016

(30) Foreign Application Priority Data

Jun. 2, 2015 (KR) ........................ 10-2015-0078005

(51) Int. Cl.
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2048* (2013.01)

(58) Field of Classification Search
CPC ............... F16H 3/66; F16H 2200/0073; F16H 2200/2012; F16H 2200/2048
See application file for complete search history.

(56) References Cited

U.S. PATENT DOCUMENTS

| 9,255,627 | B2 | 2/2016 | Shibamura et al. | |
| 2007/0060439 | A1 | 3/2007 | Kamada et al. | |
| 2016/0169333 | A1* | 6/2016 | Cho | F16H 3/66 |
| | | | | 475/275 |
| 2016/0169339 | A1* | 6/2016 | Cho | F16H 3/66 |
| | | | | 475/275 |
| 2016/0169340 | A1* | 6/2016 | Cho | F16H 3/66 |
| | | | | 475/275 |
| 2016/0327132 | A1* | 11/2016 | Lee | F16H 3/66 |
| 2016/0333982 | A1* | 11/2016 | Hwang | F16H 3/66 |

FOREIGN PATENT DOCUMENTS

KR 10-1394033 B1 5/2014

\* cited by examiner

*Primary Examiner* — Terry Chau
(74) *Attorney, Agent, or Firm* — Morgan, Lewis & Bockius LLP

(57) ABSTRACT

A planetary gear train of an automatic transmission for a vehicle may include: an input shaft receiving torque of an engine; an output shaft outputting changed torque; a first planetary gear set including a first rotation element, a second rotation element, and a third rotation element; a second planetary gear set including a fourth rotation element, a fifth rotation element, and a sixth rotation element; a third planetary gear set including a seventh rotation element, an eighth rotation element, and a ninth rotation element; and a fourth planetary gear set including tenth, eleventh, and twelfth rotation elements.

8 Claims, 2 Drawing Sheets

FIG. 2

| | control element | | | | | | | gear ratio | step ratio | gear ratio span |
|---|---|---|---|---|---|---|---|---|---|---|
| | B1 | B2 | B3 | C1 | C2 | C3 | C4 | | | |
| D1 | | ● | ● | | | ● | | 4.725 | 1.141 | 9.51 |
| D2 | | | ● | ● | | ● | | 3.342 | 1.337 | |
| D3 | | | ● | | ● | ● | | 2.5 | 1.336 | |
| D4 | ● | | | | ● | | | 1.834 | 1.180 | |
| D5 | | | ● | ● | ● | | | 1.554 | 1.223 | |
| D6 | ● | | | ● | ● | | | 1.27 | 1.27 | |
| D7 | | | | | ● | | ● | 1.0 | 1.145 | |
| D8 | ● | | | ● | | | ● | 0.873 | 1.189 | |
| D9 | ● | | | | | | ● | 0.734 | 1.180 | |
| D10 | ● | | | ● | | ● | ● | 0.622 | 1.251 | |
| D11 | | | | ● | | ● | | 0.497 | | |
| REV | | ● | | | | ● | | -3.226 | | |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0078005 filed on Jun. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle improves power delivery performance and reduces fuel consumption by achieving eleven forward speed stages and widening gear ratio span using a minimum number of constituent elements and securing linearity of step ratios.

Description of Related Art

In recent years, a rise in oil price causes dashing into unlimited competition for enhancing fuel efficiency.

As a result, researches into reduction of a weight and the enhancement of the fuel efficiency through down sizing are conducted in the case of an engine and researches for simultaneously securing operability and fuel efficiency competitiveness through multiple speed stages are conducted in the case of an automatic transmission.

However, in the automatic transmission, as the number of speed stages increase, the number of internal components increase, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

In this aspect, in recent years, 8-speed automatic transmissions tend to be implemented and the research and development of a planetary gear train capable of implementing more speed stages has also been actively conducted.

However, since a conventional 8-speed automatic transmission has gear ratio span of 6.5-7.5, improvement of fuel economy may not be great.

In addition, if 8-speed automatic transmission has gear ratio span larger than 9.0, it is hard to secure linearity of step ratios. Therefore, driving efficiency of an engine and drivability of a vehicle may be deteriorated, and thus, development of high efficiency automatic transmissions which achieve at least nine forward speed stages is necessary.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving eleven forward speed stages and one reverse speed stage and widening gear ratio span and of securing linearity of step ratios.

A planetary gear train of an automatic transmission for a vehicle according to an exemplary embodiment of the present invention may include: an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements, wherein the input shaft is directly connected to the second rotation element, the output shaft is directly connected to the eleventh rotation element, the third rotation element is directly connected to the fourth, eighth, and tenth rotation elements, the sixth rotation element is directly connected to the seventh rotation element, the sixth and seventh rotation elements are selectively connected to the eleventh rotation element, the second rotation element is selectively connected respectively to the fifth rotation element and the ninth rotation element, the fifth rotation element is selectively connected to the twelfth rotation element, the first rotation element is selectively connected to a transmission housing, the fifth rotation element is selectively connected to the transmission housing, and the twelfth rotation element is selectively connected to the transmission housing.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear.

Each of the first, second, third, and fourth planetary gear sets may be a single pinion planetary gear set.

The planetary gear train may further include: a first clutch selectively connecting the sixth and seventh rotation elements to the eleventh rotation element; a second clutch selectively connecting the second rotation element to the fifth rotation element; a third clutch selectively connecting the second rotation element to the ninth rotation element; a fourth clutch selectively connecting the fifth rotation element to the twelfth rotation element; a first brake selectively connecting the first rotation element to the transmission housing; a second brake selectively connecting the fifth rotation element to the transmission housing; and a third brake selectively connecting the twelfth rotation element to the transmission housing.

A planetary gear train of an automatic transmission for a vehicle according to another exemplary embodiment of the present invention may include: an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first rotation shaft connected to the first rotation element and selectively connected to a transmission housing; a second rotation shaft connected to the second rotation element and directly connected to the input shaft; a third rotation shaft connecting the third rotation element, the fourth rotation element, the eighth rotation element, and the tenth rotation element; a fourth rotation shaft connected to the fifth rotation element, selectively connected to the second rotation shaft, and selectively connected to the transmission housing; a fifth rotation shaft connecting the sixth rotation element with the seventh rotation element; a sixth rotation shaft connected to the ninth rotation element and selectively connected to the second rotation shaft; a seventh rotation shaft connected to the eleventh rotation element, selectively connected to the fifth rotation shaft, and directly connected to the output shaft; and an eighth rotation shaft connected to the twelfth rotation element, selectively connected to the fourth rotation shaft, and selectively connected to the transmission housing.

The first planetary gear set may be a single pinion planetary gear set and may include a first sun gear as the first rotation element, a first planet carrier as the second rotation element, and a first ring gear as the third rotation element. The second planetary gear set may be a single pinion planetary gear set and may include a second sun gear as the fourth rotation element, a second planet carrier as the fifth rotation element, and a second ring gear as the sixth rotation element. The third planetary gear set may be a single pinion planetary gear set and may include a third sun gear as the seventh rotation element, a third planet carrier as the eighth rotation element, and a third ring gear as the ninth rotation element. The fourth planetary gear set may be a single pinion planetary gear set and may include a fourth sun gear as the tenth rotation element, a fourth planet carrier as the eleventh rotation element, and a fourth ring gear as the twelfth rotation element.

The planetary gear train may further include: a first clutch selectively connecting the fifth rotation shaft to the seventh rotation shaft; a second clutch selectively connecting the second rotation shaft to the fourth rotation shaft; a third clutch selectively connecting the second rotation shaft to the sixth rotation shaft; a fourth clutch selectively connecting the fourth rotation shaft to the eighth rotation shaft; a first brake selectively connecting the first rotation shaft to the transmission housing; a second brake selectively connecting the fourth rotation shaft to the transmission housing; and a third brake selectively connecting the eighth rotation shaft to the transmission housing.

The third clutch and the second and third brakes may be operated at a first forward speed stage, the first and third clutches and the third brake may be operated at a second forward speed stage, the second and third clutches and the third brake may be operated at a third forward speed stage, the second clutch and the first and third brakes may be operated at a fourth forward speed stage, the first and second clutches and the third brake may be operated at a fifth forward speed stage, the first and second clutches and the first brake may be operated at a sixth forward speed stage, the first, second, and fourth clutches may be operated at a seventh forward speed stage, the second and fourth clutches and the first brake may be operated at an eighth forward speed stage, the first and fourth clutches and the first brake may be operated at a ninth forward speed stage, the third and fourth clutches and the first brake may be operated at a tenth forward speed stage, the first and third clutches and the first brake may be operated at an eleventh forward speed stage, and the first and third clutches and the second brake may be operated at a reverse speed stage.

An exemplary embodiment of the present invention may achieve eleven forward speed stages and one reverse speed stage by combining four planetary gear sets with seven control elements.

In addition, since gear ratio span greater than 9.0 is secured, driving efficiency of the engine may be maximized.

In addition, since linearity of step ratios is secured, drivability such as acceleration before and after shift, rhythmical engine speed, and so on may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to an exemplary embodiment of the present invention.

Figure 1:
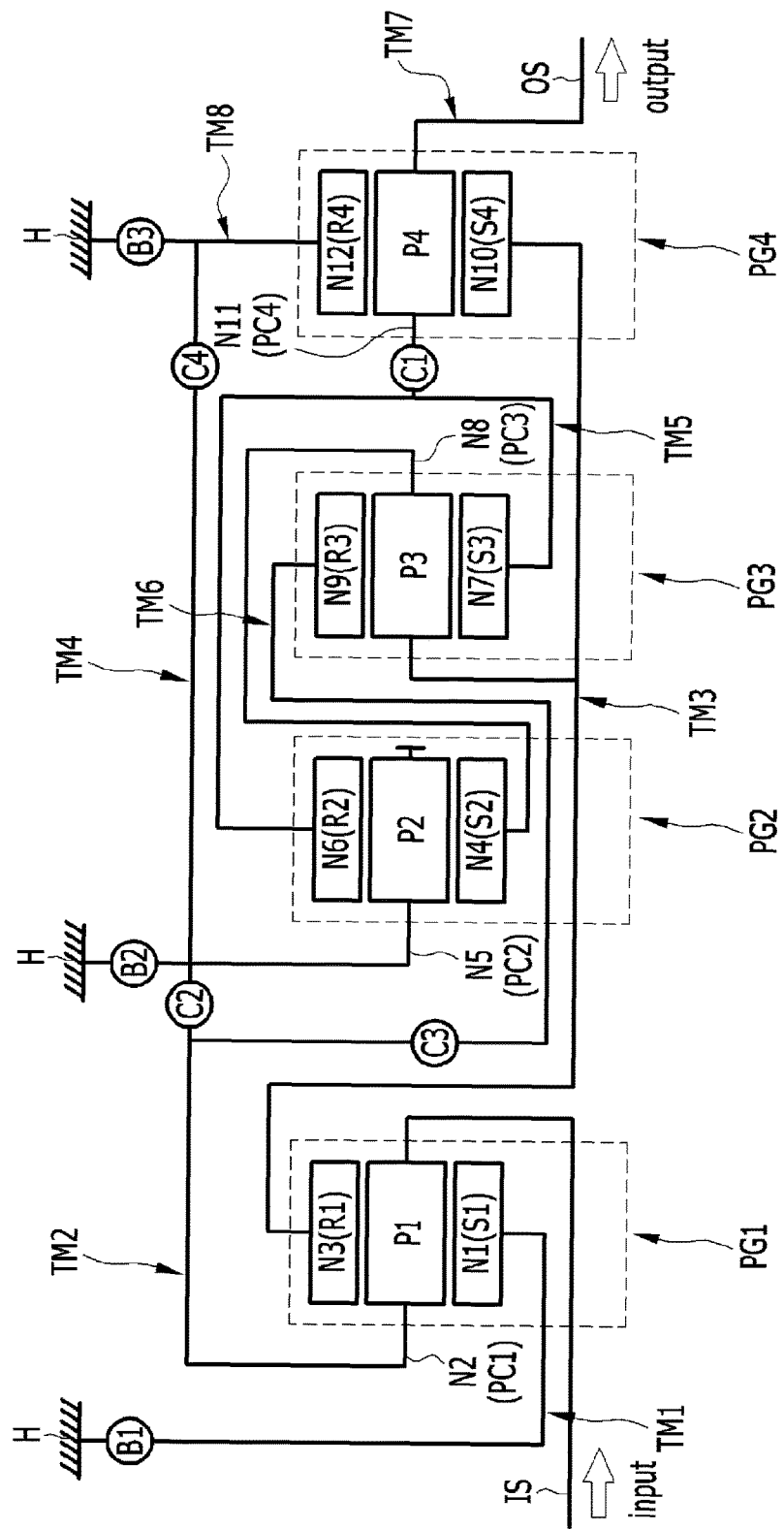
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, and fourth planetary gear sets PG1, PG2, PG3, and PG4 disposed on the same axis, and input shaft IS, an output shaft OS, eight rotation shafts TM1 to TM8 connected to at least one of rotation elements of the first, second, third, and fourth planetary gear sets PG1, PG2, PG3, and PG4, seven control elements C1 to C4 and B1 to B3, and a transmission housing H.

As a result, torque input from the input shaft IS is changed by cooperation of the first, second, third, and fourth planetary gear sets PG1, PG2, PG3, and PG4, and the changed torque is output through the output shaft OS.

The simple planetary gear sets are disposed in a sequence of the first, second, third, and fourth planetary gear sets PG1, PG2, PG3, and PG4 from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1 as a first rotation element N1, a first planet carrier PC1, as a second rotation element N2, rotatably supporting a first pinion P1 that is externally meshed with the first sun gear S1, and a first ring gear R1 that is, as a third rotation element N3, internally meshed with the first pinion P1 respectively as first, second, and third rotation elements.

The second planetary gear set PG2 is a single pinion planetary gear set and includes a second sun gear S2 as a fourth rotation element N4, a second planet carrier PC2, as a fifth rotation element N5, rotatably supporting a second pinion P2 that is externally meshed with the second sun gear S2, and a second ring gear R2 that is as a sixth rotation element N6 internally meshed with the second pinion P2 respectively as fourth, fifth, and sixth rotation elements.

The third planetary gear set PG3 is a single pinion planetary gear set and includes a third sun gear S3 as a seventh rotation element N7, a third planet carrier PC3, as an eighth rotation element N8, rotatably supporting a third pinion P3 that is externally meshed with the third sun gear S3, and a third ring gear R3 that is, as a ninth rotation element N9, internally meshed with the third pinion P3 respectively as seventh, eighth, and ninth rotation elements.

The fourth planetary gear set PG4 is a single pinion planetary gear set and includes a fourth sun gear S4 as a tenth rotation element N10, a fourth planet carrier PC4, as an eleventh rotation element N11, rotatably supporting a fourth pinion P4 that is externally meshed with the fourth sun gear S4, and a fourth ring gear R4 that is, as a twelfth rotation element N12, internally meshed with the fourth pinion P4 respectively as tenth, eleventh, and twelfth rotation elements.

The third rotation element N3 is directly connected to the fourth rotation element N4, the eighth rotation element N8, and the tenth rotation element N10, and the sixth rotation element N6 is directly connected to the seventh rotation element N7 such that the first, second, third, and fourth planetary gear sets PG1, PG2, PG3, and PG4 are operated with eight rotation shafts TM1 to TM8.

The eight rotation shafts TM1 to TM8 will be described in further detail.

The first rotation shaft TM1 is connected to the first sun gear S1 and is selectively connected to the transmission housing H.

The second rotation shaft TM2 is connected to the first planet carrier PC1 and is directly connected to the input shaft IS.

The third rotation shaft TM3 connects the first ring gear R1, the second sun gear S2, the third planet carrier PC3, and the fourth sun gear S4.

The fourth rotation shaft TM4 is connected to the second planet carrier PC2, is selectively connected to the second rotation shaft TM2, and is selectively connected to the transmission housing H.

The fifth rotation shaft TM5 connects the second ring gear R2 to the third sun gear S3.

The sixth rotation shaft TM6 is connected to the third ring gear R3 and is selectively connected to the second rotation shaft TM2.

The seventh rotation shaft TM7 is connected to the fourth planet carrier PC4, is selectively connected to the fifth rotation shaft TM5, and is directly connected to the output shaft OS.

The eighth rotation shaft TM8 is connected to the fourth ring gear R4, is selectively connected to the fourth rotation shaft TM4, and is selectively connected to the transmission housing H.

In addition, four clutches C1, C2, C3, and C4 being control elements are disposed at connection portions between any two rotation shafts among the rotation shafts TM1 to TM8.

In addition, three brakes B1, B2, and B3 being control elements are disposed at connection portions between any one rotation shaft among the rotation shaft TM1 to TM8 and the transmission housing H.

The seven control elements C1 to C4 and B1 to B3 will be described in further detail.

The first clutch C1 is disposed between the fifth rotation shaft TM5 and the seventh rotation shaft TM7 and causes the fifth rotation shaft TM5 and the seventh rotation shaft TM7 to integrally rotate with each other.

The second clutch C2 is disposed between the second rotation shaft TM2 and the fourth rotation shaft TM4 and causes the second rotation shaft TM2 and the fourth rotation shaft TM4 to integrally rotate with each other.

The third clutch C3 is disposed between the second rotation shaft TM2 and the sixth rotation shaft TM6 and causes the second rotation shaft TM2 and the sixth rotation shaft TM6 to integrally rotate with each other.

The fourth clutch C4 is disposed between the fourth rotation shaft TM4 and the eighth rotation shaft TM8 and causes the fourth rotation shaft TM4 and the eighth rotation shaft TM8 to integrally rotate with each other.

The first brake B1 is disposed between the first rotation shaft TM1 and the transmission housing H and causes the first rotation shaft TM1 to be operated as a selective fixed element.

The second brake B2 is disposed between the fourth rotation shaft TM4 and the transmission housing H and causes the fourth rotation shaft TM4 to be operated as a selective fixed element.

The third brake B3 is disposed between the eighth rotation shaft TM8 and the transmission housing H causes the eighth rotation shaft TM8 to be operated as a selective fixed element.

The control elements including the first, second, third, and fourth clutches C1, C2, C3, and C4 and the first, second, and third brakes B1, B2, and B3 may be multi-plates friction elements of wet type that are operated by hydraulic pressure.

FIG. 2 is an operation chart of control elements at each speed stage in the planetary gear train according to an exemplary embodiment of the present invention.

As shown in FIG. 2, three control elements are operated at each speed stage in the planetary gear train according to the exemplary embodiment of the present invention.

The third clutch C3 and the second and third brakes B2 and B3 are operated at a first forward speed stage D1. In a state that the second rotation shaft TM2 is connected to the sixth rotation shaft TM6 by operation of the third clutch C3, torque of the input shaft IS is input to the second rotation shaft TM2. In addition, the fourth and eighth rotation shafts TM4 and TM8 are operated as the fixed elements by operation of the second and third brakes B2 and B3. Therefore, the torque of the input shaft IS is shifted into the first forward speed stage, and the first forward speed stage is output through the seventh rotation shaft TM7.

The first and third clutches C1 and C3 and the third brake B3 are operated at a second forward speed stage D2. In a state that the fifth rotation shaft TM5 is connected to the seventh rotation shaft TM7 by operation of the first clutch C1 and the second rotation shaft TM2 is connected to the sixth rotation shaft TM6 by operation of the third clutch C3, the torque of the input shaft IS is input to the second input shaft TM2. In addition, the eighth rotation shaft TM8 is operated as the fixed element by operation of the third brake B3. Therefore, the torque of the input shaft IS is shifted into the second forward speed stage, and the second forward speed stage is output through the seventh rotation shaft TM7.

The second and third clutches C2 and C3 and the third brake B3 are operated at a third forward speed stage D3. In a state that the second rotation shaft TM2 is connected to the fourth rotation shaft TM4 by operation of the second clutch C2 and the second rotation shaft TM2 is connected to the sixth rotation shaft TM6 by operation of the third clutch C3, the torque of the input shaft IS is input to the second input shaft TM2. In addition, the eighth rotation shaft TM8 is operated as the fixed element by operation of the third brake B3. Therefore, the torque of the input shaft IS is shifted into the third forward speed stage, and the third forward speed stage is output through the seventh rotation shaft TM7.

The second clutch C2 and the first and third brakes B1 and B3 are operated at a fourth forward speed stage D4. In a state that the second rotation shaft TM2 is connected to the fourth rotation shaft TM4 by operation of the second clutch C2, the torque of the input shaft IS is input to the second input shaft TM2. In addition, the first and eighth rotation shafts TM1 and TM8 are operated as the fixed elements by operation of the first and third brakes B1 and B3. Therefore, the torque of the input shaft IS is shifted into the fourth forward speed stage, and the fourth forward speed stage is output through the seventh rotation shaft TM7.

The first and second clutches C1 and C2 and the third brake B3 are operated at a fifth forward speed stage D5. In a state that the fifth rotation shaft TM5 is connected to the seventh rotation shaft TM7 by operation of the first clutch C1 and the second rotation shaft TM2 is connected to the fourth rotation shaft TM4 by operation of the second clutch C2, the torque of the input shaft IS is input to the second input shaft TM2. In addition, the eighth rotation shaft TM8 is operated as the fixed element by operation of the third brake B3. Therefore, the torque of the input shaft IS is shifted into the fifth forward speed stage, and the fifth forward speed stage is output through the seventh rotation shaft TM7.

The first and second clutches C1 and C2 and the first brake B1 are operated at a sixth forward speed stage D6. In a state that the fifth rotation shaft TM5 is connected to the seventh rotation shaft TM7 by operation of the first clutch C1 and the second rotation shaft TM2 is connected to the fourth rotation shaft TM4 by operation of the second clutch C2, the torque of the input shaft IS is input to the second input shaft TM2. In addition, the first rotation shaft TM1 is operated as the fixed element by operation of the first brake B1. Therefore, the torque of the input shaft IS is shifted into the sixth forward speed stage, and the sixth forward speed stage is output through the seventh rotation shaft TM7.

The first, second, and fourth clutches C1, C2, and C4 are operated at a seventh forward speed stage D7. The fifth rotation shaft TM5 is connected to the seventh rotation shaft TM7 by operation of the first clutch C1, the second rotation shaft TM2 is connected to the fourth rotation shaft TM4 by operation of the second clutch C2, and the fourth rotation shaft TM4 is connected to the eighth rotation shaft TM8 by operation of the fourth clutch C4 such that the first, second, third, and fourth planetary gear sets PG1, PG2, PG3, and PG4 become lock-up states. Therefore, the torque of the input shaft IS is output through the seventh rotation shaft TM7 without speed change.

The second and fourth clutches C2 and C4 and the first brake B1 are operated at an eighth forward speed stage D8. In a state that the second rotation shaft TM2 is connected to the fourth rotation shaft TM4 by operation of the second clutch C2 and the fourth rotation shaft TM4 is connected to the eighth rotation shaft TM8 by operation of the fourth clutch C4, the torque of the input shaft IS is input to the second input shaft TM2. In addition, the first rotation shaft TM1 is operated as the fixed element by operation of the first brake B1. Therefore, the torque of the input shaft IS is shifted into the eighth forward speed stage, and the eighth forward speed stage is output through the seventh rotation shaft TM7.

The first and fourth clutches C1 and C4 and the first brake B1 are operated at a ninth forward speed stage D9. In a state that the fifth rotation shaft TM5 is connected to the seventh rotation shaft TM7 by operation of the first clutch C1 and the fourth rotation shaft TM4 is connected to the eighth rotation shaft TM8 by operation of the fourth clutch C4, the torque of the input shaft IS is input to the second input shaft TM2. In addition, the first rotation shaft TM1 is operated as the fixed element by operation of the first brake B1. Therefore, the torque of the input shaft IS is shifted into the ninth forward speed stage, and the ninth forward speed stage is output through the seventh rotation shaft TM7.

The third and fourth clutches C3 and C4 and the first brake B1 are operated at a tenth forward speed stage D10. In a state that the second rotation shaft TM2 is connected to the sixth rotation shaft TM6 by operation of the third clutch C3 and the fourth rotation shaft TM4 is connected to the eighth rotation shaft TM8 by operation of the fourth clutch C4, the torque of the input shaft IS is input to the second input shaft TM2. In addition, the first rotation shaft TM1 is operated as the fixed element by operation of the first brake B1. Therefore, the torque of the input shaft IS is output through the tenth forward speed stage, and the tenth forward speed stage is output through the seventh rotation shaft TM7.

The first and third clutches C1 and C3 and the first brake B1 are operated at an eleventh forward speed stage D11. In a state that the fifth rotation shaft TM5 is connected to the seventh rotation shaft TM7 by operation of the first clutch C1 and the second rotation shaft TM2 is connected to the sixth rotation shaft TM6 by operation of the third clutch C3, the torque of the input shaft IS is input to the second input shaft TM2. In addition, the first rotation shaft TM1 is operated as the fixed element by operation of the first brake B1. Therefore, the torque of the input shaft IS is shifted into the eleventh forward speed stage, and the eleventh forward speed stage is output through the seventh rotation shaft TM7.

The first and third clutches C1 and C3 and the second brake B2 are operated at a reverse speed stage REV. In a state that the fifth rotation shaft TM5 is connected to the seventh rotation shaft TM7 by operation of the first clutch C1 and the second rotation shaft TM2 is connected to the sixth rotation shaft TM6 by operation of the third clutch C3, the torque of the input shaft IS is input to the second input shaft TM2. In addition, the second rotation shaft TM2 is operated as the fixed element by operation of the second brake B2. Therefore, the torque of the input shaft IS is shifted into the reverse speed stage, and the reverse speed stage is output through the seventh rotation shaft TM7.

The planetary gear train according to the exemplary embodiment of the present invention may achieve eleven forward speed stages and one reverse speed stage by control of four planetary gear sets PG1, PG2, PG3, and PG4, four clutches C1, C2, C3, and C4, and three brakes B1, B2, and B3.

In addition, since gear ratio span greater than 9.0 is secured, driving efficiency of the engine may be maximized.

In addition, since linearity of step ratios is secured, drivability such as acceleration before and after shift, rhythmical engine speed, and so on may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element; and
   a fourth planetary gear set including tenth, eleventh, and twelfth rotation elements,
   wherein the input shaft is directly connected to the second rotation element,
   the output shaft is directly connected to the eleventh rotation element,
   the third rotation element is directly connected to the fourth, eighth, and tenth rotation elements,
   the sixth rotation element is directly connected to the seventh rotation element,
   the sixth and seventh rotation elements are selectively connected to the eleventh rotation element,
   the second rotation element is selectively connected respectively to the fifth rotation element and the ninth rotation element,
   the fifth rotation element is selectively connected to the twelfth rotation element,
   the first rotation element is selectively connected to a transmission housing,
   the fifth rotation element is selectively connected to the transmission housing, and
   the twelfth rotation element is selectively connected to the transmission housing.

2. The planetary gear train of claim 1, wherein the first rotation element, the second rotation element, and the third rotation element of the first planetary gear set are a first sun gear, a first planet carrier, and a first ring gear,
   the fourth rotation element, the fifth rotation element, and the sixth rotation element of the second planetary gear set are a second sun gear, a second planet carrier, and a second ring gear,
   the seventh rotation element, the eighth rotation element, and the ninth rotation element of the third planetary gear set are a third sun gear, a third planet carrier, and a third ring gear, and
   the tenth rotation element, the eleventh rotation element, and the twelfth rotation element of the fourth planetary gear set are a fourth sun gear, a fourth planet carrier, and a fourth ring gear.

3. The planetary gear train of claim 2, wherein each of the first, second, third, and fourth planetary gear sets is a single pinion planetary gear set.

4. The planetary gear train of claim 1, further comprising:
   a first clutch selectively connecting the sixth and seventh rotation elements to the eleventh rotation element;
   a second clutch selectively connecting the second rotation element to the fifth rotation element;
   a third clutch selectively connecting the second rotation element to the ninth rotation element;
   a fourth clutch selectively connecting the fifth rotation element to the twelfth rotation element;
   a first brake selectively connecting the first rotation element to the transmission housing;
   a second brake selectively connecting the fifth rotation element to the transmission housing; and
   a third brake selectively connecting the twelfth rotation element to the transmission housing.

5. A planetary gear train of an automatic transmission for a vehicle, comprising:
   an input shaft receiving torque of an engine;
   an output shaft outputting changed torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including tenth, eleventh, and twelfth rotation elements;
   a first rotation shaft connected to the first rotation element and selectively connected to a transmission housing;
   a second rotation shaft connected to the second rotation element and directly connected to the input shaft;
   a third rotation shaft connecting the third rotation element, the fourth rotation element, the eighth rotation element, and the tenth rotation element;

a fourth rotation shaft connected to the fifth rotation element, selectively connected to the second rotation shaft, and selectively connected to the transmission housing;

a fifth rotation shaft connecting the sixth rotation element with the seventh rotation element;

a sixth rotation shaft connected to the ninth rotation element and selectively connected to the second rotation shaft;

a seventh rotation shaft connected to the eleventh rotation element, selectively connected to the fifth rotation shaft, and directly connected to the output shaft; and an eighth rotation shaft connected to the twelfth rotation element, selectively connected to the fourth rotation shaft, and selectively connected to the transmission housing.

6. The planetary gear train of claim 5, wherein the first planetary gear set is a single pinion planetary gear set and includes a first sun gear as the first rotation element, a first planet carrier as the second rotation element, and a first ring gear as the third rotation element, the second planetary gear set is a single pinion planetary gear set and includes a second sun gear as the fourth rotation element, a second planet carrier as the fifth rotation element, and a second ring gear as the sixth rotation element, the third planetary gear set is a single pinion planetary gear set and includes a third sun gear as the seventh rotation element, a third planet carrier as the eighth rotation element, and a third ring gear as the ninth rotation element, and the fourth planetary gear set is a single pinion planetary gear set and includes a fourth sun gear as the tenth rotation element, a fourth planet carrier as the eleventh rotation element, and a fourth ring gear as the twelfth rotation element.

7. The planetary gear train of claim 5, further comprising:

a first clutch selectively connecting the fifth rotation shaft to the seventh rotation shaft;

a second clutch selectively connecting the second rotation shaft to the fourth rotation shaft;

a third clutch selectively connecting the second rotation shaft to the sixth rotation shaft;

a fourth clutch selectively connecting the fourth rotation shaft to the eighth rotation shaft;

a first brake selectively connecting the first rotation shaft to the transmission housing;

a second brake selectively connecting the fourth rotation shaft to the transmission housing; and a third brake selectively connecting the eighth rotation shaft to the transmission housing.

8. The planetary gear train of claim 7, wherein the third clutch and the second and third brakes are operated at a first forward speed stage, the first and third clutches and the third brake are operated at a second forward speed stage, the second and third clutches and the third brake are operated at a third forward speed stage, the second clutch and the first and third brakes are operated at a fourth forward speed stage, the first and second clutches and the third brake are operated at a fifth forward speed stage, the first and second clutches and the first brake are operated at a sixth forward speed stage, the first, second, and fourth clutches are operated at a seventh forward speed stage, the second and fourth clutches and the first brake are operated at an eighth forward speed stage, the first and fourth clutches and the first brake are operated at a ninth forward speed stage, the third and fourth clutches and the first brake are operated at a tenth forward speed stage, the first and third clutches and the first brake are operated at an eleventh forward speed stage, and the first and third clutches and the second brake are operated at a reverse speed stage.

\* \* \* \* \*